United States Patent Office 3,669,722
Patented June 13, 1972

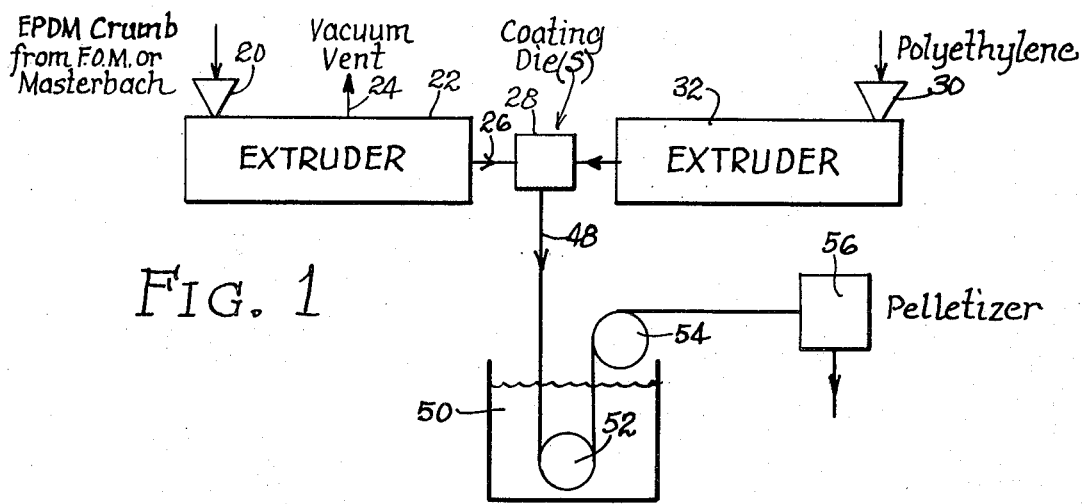
FIG. 1
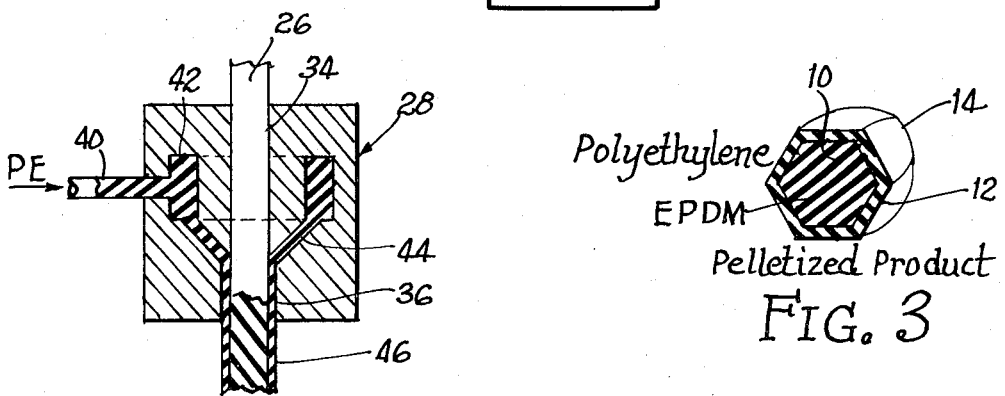
FIG. 2
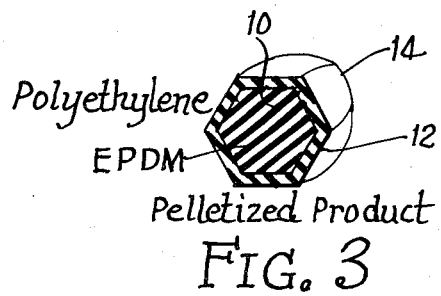
FIG. 3
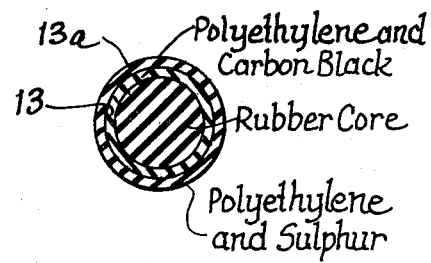
FIG. 4
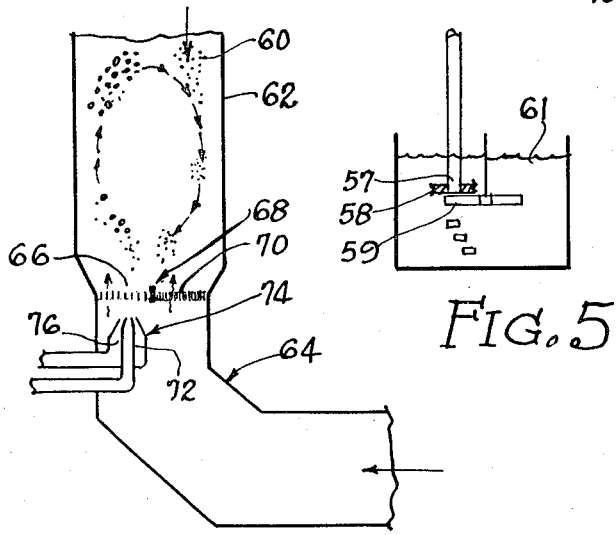
FIG. 5
FIG. 6
INVENTOR
William A. Bishop
by McDougall, Hersh, Scott and Ladd
Attys

3,669,722
FREE FLOWING PELLETS OF UNCURED ELASTOMERIC MATERIAL
William A. Bishop, Baton Rouge, La., assignor to Copolymer Rubber & Chemical Corporation, Baton Rouge, La.
Filed June 25, 1969, Ser. No. 836,416
Int. Cl. B32b 25/08; B44d 5/08
U.S. Cl. 117—100 C          5 Claims

ABSTRACT OF THE DISCLOSURE

Free flowing pellets of tacky elastomeric material in which the elastomeric material forms a core coated with one or more layers in which the outermost layer is a hard non-tacky layer containing a film forming material.

---

This invention relates to the manufacture of synthetic polymeric elastomeric materials, in an uncured stage, for subsequent use in the manufacture of rubber products, such as tubing, belts, tires, sheeting and the like, by subsequent cure or vulcanization of the formulations embodying the synthetic polymeric elastomers and it relates more particularly to free flowing pellets of such synthetic elastomeric materials and the method for the preparation of same to improve the handling of such materials in packaging, shipment and use, as will hereinafter appear.

The invention will be described with reference to a wide variety of elastomeric materials formed by emulsion or solution polymerization or copolymerization of mono-olefinic, conjugated diolefinic and/or polyolefinic compounds and coagulated from aqueous or medium solution by steam or by the addition of an aqueous or acidic aqueous medium to form a rubber crumb which is dewatered before packaging and use. Elastomers of the type described include a general class referred to as EPDM rubbers, such as described in the copending application of Ginn, Ser. No. 569,836, filed Aug. 3, 1966, and entitled "Preparation of Elastomers," now Pat. No. 3,507,842, issued Apr. 21, 1970. For further description of the preparation of such elastomeric materials, reference can also be made to U.S. Pat. No. 3,055,856, U.S. Pat. No. 3,479,360 and U.S. Pat. No. 3,092,603.

It will be understood, however, that the rubbers processed in accordance with the practice of this invention may include natural rubber as well as others of the synthetic rubbers such as SBR rubbers, isoprene rubbers, neoprene rubbers, butyl rubber, polychloroprene, butadiene-acrylonitrile or butadiene-styrene rubbers, and the like. The invention is particularly applicable to such elastomeric materials formulated during processing to include desirable compounding ingredients, such as carbon black and other fillers in the process generally referred to in the trade as "master-batching."

In the preparation of such polymeric or copolymeric materials, the polymer or copolymer, after they are formed, are coagulated for separation from the medium in which polymerization takes place to provide a solid polymeric particle. In the processes described in the aforementioned patents and application, the polymer or copolymer is coagulated from aqueous or solvent medium by the introduction of copius amounts of water, with or without acidification, to separate out the elastomeric polymer as a wet crumb in the form of pellets ranging in size from about ⅛ inch to ½ inch in diameter. Water removal is effected by the combination of continuous filtering or decantation to remove the major amount of free water followed by tray drying or fluidized bed drying to produce dry crumb having only a small percentage of residual water. Instead, water removal can be effected by decantation or continuous filtering to remove the major portion of the free water and by squeezing out most of the remaining water by processing the material through a French Oil type of mill from which the dried rubber is extruded and shredded into particles.

In either event, the dried elastomeric particles or crumb are compressed into bales of predetermined weight and the bales are wrapped for shipment to the fabricator for use in the manufacture of commercial elastomeric products, such as tubes, tires, belts, rubber coated fabrics or the like. In use, such fabricator formulates the rubber with suitable fillers, resins, vulcanizing or curing agents, extenders, activators and the like for compounding in mixing and processing equipment, such as Banburying or rolls, uniformly to distribute the additives with the elastomeric material prior to molding and/or heating for cure or vulcanization of the elastomeric material in the manufacture of the desired end product. Thus the fabricator is required to break up the bale of elastomeric material for measuring out the desired amount and to subject the matter to substantial processing uniformly to compound the additives with the elastomer.

The uncured elastomeric polymeric particles, whether in the form of crumb or shreds, remains tacky so that it becomes easy to agglomerate the particles into bundles or bales for wrapping or shipping. However, because of the stickiness of the elastomeric particles, it is difficult to separate or otherwise break up the bales of elastomeric material for purposes of measuring out predetermined amounts for compounding.

It is an object of this invention to produce and to provide a method for producing such elastomeric materials in the form of free flowing particles or pellets which provide greater flexibility in packaging, shipment and use, which enables the material to be accurately weighed for admixture with additives or other elastomers and/or extenders in subsequent compounding of the material, which enables the use of continuous or automatic weighing and processing equipment for the handling of the elastomeric material, which enables greater flexibility in packaging and shipment in containers of various dimensions and shapes, which enables preparation of the elastomeric particles with one or more of the additives combined therewith to alleviate the number of ingredients required to be formulated with elastomeric materials during compounding and whereby such additives can be more uniformly distributed in the desired amounts with the elastomeric material, and finally which enables the elastomeric materials in pellet form to be more effectively and efficiently processed through conventional compounding equipment for the production of a more desirable compound in the manufacture of elastomeric products.

These and other objects and advantages of this invention will hereinafter appear and for purposes of illustration, but not of limitation, embodiments of the invention are shown in the accompanying drawings, in which—

FIG. 1 is a schematic flow diagram illustrating the arrangement of equipment in preparation of the product embodying the features of this invention;

FIG. 2 is a sectional elevational view of the coating die illustrated in the equipment of FIG. 1;

FIG. 3 is a sectional view through a pellet of encapsulated elastomeric material produced by the equipment of FIG. 1;

FIG. 4 is a sectional view similar to that of FIG. 3 showing the pellet of elastomeric material encapsulated with plural coatings containing materials with which the elastomer is to be compounded;

FIG. 5 is a schematic view of another means for pelletizing; and

FIG. 6 is a sectional elevational view of another means for producing the encapsulated pellet of elastomeric material.

In accordance with the practice of this invention, free flowing pellets of the tacky elastomeric pellets are formed by the coating of the elastomeric particles to provide a central core 10 of the tacky elastomeric material and one or more outer shells of coatings 12 of a relatively hard non-tacky material or materials which may be removed from the core of elastomeric material for subsequent use but which, in the preferred practice of this invention, represents one or more of the ingredients intended to be compounded with the elastomeric core material in the manufacture of a desirable elastomeric product. Representative of the materials which may be used to form the encapsulating shell or coating 12 are synthetic resins or polymeric materials, such as polyethylene, polyvinyl chloride, polyvinyl acetate, vinyl acetate-vinyl chloride copolymer, polyacrylic acid esters or polyalkyl acid esters and the like. Instead of making use of a synthetic resinous material for encapsulating the elastomeric particles, use can be made of another elastomeric material which is characterized by being free of tack and which, in the preferred practice, is a component compounded with the material making up the elastomeric core. Representative of such tack-free synthetic elastomeric coating or encapsulating material are EPDM rubbers of the types previously described having a higher polyethylene content such as an ethylene, propylene, 5-ethylidene-2-norbornene in which the materials are polymerized in the ratio of 68 parts by weight ethylene, 28 parts by weight propylene and 4 parts by weight 5-ethylidene-2-norbornene, or a high polyethylene rubber marketed by Copolymer Rubber & Chemical Corporation under the trade name "Epsyn 5508." Plasticizers or extenders for the rubber, vulcanizing or curing agents and accelerators which may be formulated into film forming ingredients to provide one or more of the castings, fillers such as zinc oxide carbon black and the like may also be formulated into one or more of the film forming ingredients adapted to form one or more of the encapsulations or coatings.

When, as in the preferred practice of this invention, the coating material is formulated to contain one or more of the ingredients to be compounded with the rubber for use, it becomes possible to formulate the coating system or encapsulating system to combine such ingredient or ingredients with the rubber in an amount to provide the desired ratio of such ingredients to rubber in the elastomeric system to be compounded for use. In addition to the incorporation of such ingredient or ingredients in the formulated amounts for compounding with the rubber, it will be apparent that formulation of such ingredients will operate uniformly to distribute the ingredients with the rubber to enhance the subsequent compounding operation. A still further advantage which is derived from the combination of this invention resides in the ability uniformly to distribute an essential ingredient which is employed only in minor amounts in the compounding of the rubber as compared to the difficulty of distribution of such minor amounts when added in bulk to the rubber batch.

Aside from the ability to formulate the encapsulated or coated rubber core to provide one or more of the compounding ingredients in uniform distribution with the rubber, one of the principal advantages resulting from the concepts of this invention is the free flowing character of the pellets that are formed which enable the pellets to be poured into suitable containers for shipment and poured from the containers in weighing out the desired amount of rubber for subsequent use. The hardened encapsulated coating about the rubber core militates against sticking of the pellets so that wide variation exists in the amount of pellets that could be packaged in any one container and it provides greater flexibility in packaging the materials for shipment. Supply of the otherwise tacky rubber as free flowing pellets enables use of automatic weighing equipment for continuous or batch-wise processing of the rubber in compounding plants or the like thereby greatly to facilitate the compounding operation as well as the labor and equipment required.

Having described the basic concepts of this invention and the advantages to be derived therefrom, description will now be made of apparatus and techniques for effecting the desired encapsulation or coating of the rubber particles to provide free flowing pellets.

Illustration is made in FIG. 1 of the means for extrusion of a continuous rod of elastomeric polymeric material and the extrusion of the encapsulating or coating material about the rod followed by hardening of the coating and reduction of the coated rod into pellets.

EPDM, in the form of crumb from the tray or fluid bed dryer or in the form of shreds from the water extractor mill, is introduced through hopper 20 into a conventional screw type extruder 22 provided with a vacuum vent 24.

A rod 26 of the elastomer issues from the outlet die of the extruder and is advanced to a coating die 28, illustrated in greater detail in FIG. 2. The continuous rod of extruded rubber may be of various cross-sections ranging from round, to oblong, to polygonal shape.

The encapsulating or coating material, represented by polyethylene as a thermoplastic film forming material often compounded with EPDM rubbers, is introduced into the hopper 30 of a separate conventional screw type extruder 32 for issuance under pressure as a melt from the outlet into the coating die 28.

As illustrated in FIG. 2, the coating die 28 is formed with a central passage 34 through which the rod 26 of EPDM rubber is continuously advanced. The central passage 34 is enlarged through a portion of its length adjacent the outlet from the die to provide an annular space 36 about the rod 26 which is adapted to be filled with the polyethylene supplied under pressure from the extruder 32 to a passage 40 communicating with an annular ring 42 spaced about the central passage 34 and which communicates with the space 36 via channels 44 to deposit a continuous outer layer 46 of polyethylene about the rod 26 of rubber.

The composite as a continuous stream 48 is advanced downwardly into a bath 50 of cooling liquid to set the coating 46 as a hardened shell about the core of rubber. The flexible rod 48 dips into the bath and turns about the roller 52 for passage upwardly out of the bath and about idler roller 54 for passage into the cutter or pelletizer 56 which reduces the rod into elements of short length or pellets. By reason of the central core of elastomeric material, which remains warm and soft, and the hardened shell, the ends 14 of the chopped or cut pellets are compressed substantially to enclose the ends with the coating material. The pellets may be of any desirable dimension, such as ranging from ⅛ inch to ½ inch in the widest cross-section and from ⅛ inch to ½ inch or more in length.

Instead, the composite as a continuous stream can be subdivided under water by a conventional underwater pelletizer such as marketed by the Hamilton Division of Black Clawson of Hamilton, Ohio, and schematically illustrated in FIG. 5. Briefly described, as the stream issues from an orifice 57 at the underside of submerged orifice plate 58, the stream is subdivided into pellets by a multi-bladed rotating knife 59 which sweeps across the orifice outlet to cut off pellets. The surface tension and residual heat remains effective to ball the cut off segments before the pellets cool in the water 61 to the solid state.

Encapsulation or coating of the rubber core in accordance with the practice of this invention, to provide a coating of very thin to very thick section or for providing multiple coatings, can also be effected by the technique described in U.S. Pat. No. 3,241,520, U.S. Pat. No. 3,253,944 and U.S. Pat. No. 3,089,824. This technique is adapted for the encapsulation of rubber crumb and is particularly applicable as a continuation of the fluidized bed principle for removal of water from the wet crumb, as described in the copending application Ser. No. 767,250, filed Oct. 14, 1968, and entitled "Means and Method for Drying Wet Elastomeric Crumb," now Pat. No. 3,525,162, issued Aug. 25, 1970.

In accordance with the practice of this concept, the dry crumb 60 from the fluidized dryer or from a tray dryer, is introduced into the tower 62 and is engaged by a stream of hot air introduced through the air conduit 64 for passage at high velocity through the coarse portion 66 of the screen 68 while air of lesser velocity passes through the finer portion 70 of the screen. As a result, the rubber crumb is caused to float in a path upwardly from the area above the coarse screen, over at the top of its flight to the area above the fine portion of the screen and then downwardly through this area to the bottom of its flight, while still being maintained in the fluidized state for return to the area of higher air velocity for recycle, if additional coating is desired. The coating composition is introduced under pressure as a solution, emulsion or dispersion with a volatile liquid, through an inlet 72 of an atomizer 74 extending into the lower section of the conduit 64 below the coarse screen 66. The feed system for the coating composition includes a second air inlet 76 for admitting compressed air about the outlet 72 to assist in further atomization of the coating liquid.

In operation, the crumb 60 is introduced into the tower. Warm air is introduced through passage 64 at a velocity adapted to fluidize the bed of the rubber crumb. The difference in air velocity between one side and the other of the screen produces a general flow of crumb upwardly on the one side and downwardly on the other side while the crumb is maintained substantially out of contact one with the other. As a crumb reaches the upper part of the tower, it ceases to move upwardly and spills over into the air stream of lower velocity and is permitted to fall in substantially weightless contact but with the velocity of the air stream remaining sufficient to support the crumb in the fluidized state. At this point, the crumb shifts over from the air stream of low velocity to the air stream of high velocity for recycle or the crumb can be removed from the tower as product.

Atomizer 74 introduces the coating material into the air stream of higher velocity to coat the crumb during upward movement in the stream of higher velocity during which maximum space exists between the crumb, while the diluent is being evaporated to set the coating on the surface of the crumb. By this technique, a very thin, non-tacky coating can be formed on the surface of the crumb or a coating of greater thickness can be provided, depending upon the amount of recycle of the crumb through the same or consecutive coating sections. Similarly, one coating composition can be applied by one section while another coating composition can be applied in subsequent sections to produce a pellet having plural coatings about the rubber core.

The product from the fluidized bed coating system will be a crumb which is completely encapsulated with an outer shell or shells of coating material. Instead of making use of rubber crumb from a fluidized bed layer, the rubber core material can be dried in a conventional manner and pelletized by an underwater pelletizer of the type described wherein the elastomeric core material is extruded through an orifice plate having multiple openings to provide plural streams for cut-off under water to form segments for coating in the fluidized coating system described above.

The following examples are given by way of illustration of pellets formed of rubber core encapsulated with fluid coatings containing ingredients with which the rubber is to be compounded in the proper amounts in which the materials are recited in parts by weight:

EXAMPLE 1

| | |
|---|---|
| Epsyn 40–A (ethylene-propylene-5-ethylidene-2-norbornene (40 Mooney)) | 100 |
| Treated hard clay | 100 |
| Paraffinic oil | 30 |
| Petrolatum | 5 |
| Low molecular weight polyethylene | 5 |
| Paraffinic wax | 12 |
| Stearic acid | 1 |
| Zinc oxide | 5 |
| TMTDS (tetramethyl thiuram disulfide) | 1 |
| Sulfur | 1 |
| MBT (mercapto benzo thiazole) | 1 |
| Sulfads | 0.5 |
| Methyl zimate | 1 |

EXAMPLE 2

| | |
|---|---|
| Epsyn 40–A | 100 |
| Hard clay | 150 |
| Whitetex | 50 |
| Naphthenic oil | 50 |
| Paraffinic wax | 10 |
| Low molecular weight polyethylene | 5 |
| Stearic acid | 5 |
| Zinc oxide | 5 |
| MBTS | 0.2 |
| Sulfur | 1.5 |
| TMTDS | 1 |
| Santocure MS | 1.8 |

EXAMPLE 3

| | |
|---|---|
| Butyl rubber | 100.0 |
| Carbon black | 72.0 |
| Hydrocarbon oil | 40.0 |
| Stearic acid | 1.0 |
| Zinc oxide | 5.0 |
| Mercaptobenzothiazole | 1.5 |
| Tetramethylthiuram monosulfide | 3.0 |
| Polyethylene | 40.0 |

In the practice of this invention, with the application of a single encapsulating coating 13 about the rubber core, the core is formed of rods or crumb or the rubber component, and one or more of the compounding ingredients of Examples 1 to 3 are formulated with the polyethylene into a treating composition to be either extruded about the core, as in FIGS. 1 and 2, or sprayed onto the core by a suitable composition, such as a solution of the polyethylene such as a 5–10% solution of polyethylene in aromatic solvent or a 3–15% dispersion of the polyethylene in aqueous medium, as described with respect to FIG. 6. In the preferred practice of the invention, the ingredients, if any, incorporated with the polyethylene would be the activators and sulfur and/or the stearic acid which are employed in small amounts in the compound and which therefore can advantageously be distributed uniformly with the rubber as a part of the encapsulating coating.

In the practice of this invention with multiple encapsulating coatings, the polyethylene component can be subdivided and formulated into separate coating compositions, such as a solid composition for extrusion or a solvent solution or aqueous dispersion for spray coating onto the rubber core. When applied from separate compositions to form concentric encapsulating coatings 13 and 13a about the rubber core, one composition can be formulated to contain some of the additional compounding ingredients, such as the stearic acid and sulfur, while another coating can be formulated to contain the activators and/or fillers for the vulcanization reaction. Thus the ingredients are embodied in separate layers with the inner layer preferably containing the ingredients which will not react with the rubber in the absence of the others of the ingredients, thereby to provide a stable free flowing system.

The remainder of compounding ingredients of Examples 1 to 3, which are not embodied within the coating or coatings, are added to the weighed amount of pellets for compoundings, unless previously incorporated directly into the rubber, as in the case of master-batching to embody the carbon black with the rubber in the core.

It will be apparent from the foregoing that I have provided a simple and efficient means for the packaging of the otherwise adhesive elastomeric material into free flowing pellets containing ingredients required to compounded with the rubber thereby to achieve rubber pellets which are capable of free flow for packaging, shipment and weighing while including one or more of the ingredients usually compounded with rubber for uniform distribution therewith during the compounding operations.

It will be understood that changes may be made in the details of operation and formulation without departing from the spirit of the invention, especially as defined in the following claims.

I claim:

1. Free flowing pellets of tacky, uncured, elastomeric polymeric material comprising a central core of the uncured elastomeric polymeric material and at least one continuous coating forming a shell about the core, and formed of a hardened, non-tacky, film forming polymeric material which is to be compounded with the elastomeric core material and which contains additional compounding ingredients also to be combined with the polymeric core material, of a filler, carbon black, vulcanizing agent, activator, or extender.

2. Free flowing pellets of elastomeric material as claimed in claim 1 in which the film forming polymeric material in the coating is polyethylene.

3. Free flowing pellets of elastomeric material as claimed in claim 1 in which more than one coating is provided about the core of elastomeric material.

4. Free flowing pellets of elastomeric material as claimed in claim 1 in which the coatings are formulated to contain the polymeric film forming material to rubber corresponding to the ratio of coating material to rubber in the elastomeric system to be compounded.

5. Free flowing pellets of tacky, uncured, elastomeric EPDM polymer comprising a central core of the uncured EPDM elastomeric polymeric material and at least one continuous coating forming a shell about the core and formed of a hardened, non-tacky, film forming polymeric material which is to be compounded with the core material.

References Cited

UNITED STATES PATENTS

| | | | |
|---|---|---|---|
| 3,379,799 | 4/1968 | Goldman | 117—72 X |
| 3,479,360 | 11/1969 | Allais | 117—100 X |
| 2,714,076 | 7/1955 | Seckel | 117—100 |
| 2,871,774 | 2/1959 | Johnson | 117—100 X |
| 2,977,864 | 4/1961 | Pullar | 117—100 X |
| 2,989,782 | 6/1961 | Barkhuff et al. | 117—100 X |
| 3,055,856 | 9/1962 | Sutherland | 117—100 X |
| 3,089,824 | 5/1963 | Wurster | 117—100 X |
| 3,092,603 | 6/1963 | Gauslaa | 117—100 X |
| 3,185,588 | 5/1965 | Resnik | 117—100 |
| 3,253,944 | 5/1966 | Wurster | 117—100 X |
| 3,241,520 | 3/1966 | Wurster | 117—100 X |
| 3,359,130 | 12/1967 | Goldman | 117—72 |

FOREIGN PATENTS

| | | | |
|---|---|---|---|
| 928,120 | 6/1963 | Great Britain | 117—100 |
| 1,041,014 | 9/1966 | Great Britain | 117—100 |
| 673,134 | 10/1963 | Canada | 117—100 |

WILLIAM D. MARTIN, Primary Examiner

M. R. P. PERRONE, Jr., Assistant Examiner

U.S. Cl. X.R.

117—72, 100 A, 138.8 UA, 139, 161 UF; 260—4 R, 897 A; 264—144

UNITED STATES PATENT OFFICE
CERTIFICATE OF CORRECTION

Patent No. 3,669,722            Dated June 13, 1972

Inventor(s) William A. Bishop

It is certified that error appears in the above-identified patent and that said Letters Patent are hereby corrected as shown below:

column 6, line 8, in the parts by weight column, change "12" to --- 10 ---;

line 24, in the parts by weight column, change "5" to --- 1 ---.

Signed and sealed this 24th day of October 1972.

(SEAL)
Attest:

EDWARD M. FLETCHER, JR.                ROBERT GOTTSCHALK
Attesting Officer                      Commissioner of Patents